United States Patent
Bade et al.

(10) Patent No.: US 9,391,878 B2
(45) Date of Patent: Jul. 12, 2016

(54) RELIABLE PACKET DELIVERY WITH OVERLAY NETWORK (RPDON)

(75) Inventors: Kalyan Bade, Sunnyvale, CA (US);
Atul B. Mahamuni, Fremont, CA (US);
Carol Barrett, Palo Alto, CA (US);
Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 144 days.

(21) Appl. No.: 13/358,130

(22) Filed: Jan. 25, 2012

(65) Prior Publication Data

US 2013/0188471 A1    Jul. 25, 2013

(51) Int. Cl.
| H04L 1/00 | (2006.01) |
| H04L 12/725 | (2013.01) |
| H04L 12/18 | (2006.01) |
| H04L 1/18 | (2006.01) |
| H04L 12/26 | (2006.01) |
| H04L 12/24 | (2006.01) |

(52) U.S. Cl.
CPC ............. H04L 45/30 (2013.01); H04L 1/0086 (2013.01); H04L 1/1838 (2013.01); H04L 1/1877 (2013.01); H04L 1/1896 (2013.01); H04L 12/1868 (2013.01); H04L 45/3065 (2013.01); H04L 41/0893 (2013.01); H04L 43/10 (2013.01)

(58) Field of Classification Search
USPC ........................................................ 370/216
See application file for complete search history.

(56) References Cited

U.S. PATENT DOCUMENTS

| 7,013,157 | B1 | 3/2006 | Norman et al. |
| 7,869,350 | B1 | 1/2011 | Bryant et al. |
| 8,050,183 | B2 * | 11/2011 | Florit et al. ................... 370/248 |
| 2003/0067912 | A1 | 4/2003 | Mead et al. |
| 2003/0177228 | A1 * | 9/2003 | Vigouroux .......... G06F 11/3055 709/224 |
| 2004/0093513 | A1 * | 5/2004 | Cantrell .............. H04L 12/2602 726/23 |

(Continued)

FOREIGN PATENT DOCUMENTS

| WO | WO-2011093836 A1 | 8/2011 |
| WO | WO 2011093836 A1 * | 8/2011 ............ H04L 1/1671 |

OTHER PUBLICATIONS

Pozzi, et al., "Notification of Transmittal of the International Search Report and the Written Opinion of the International Searching Authority, or the Declaration", Patent Cooperation Treaty, International Appl. No. PCT/US2013/023144, mailed May 22, 2013, 11 pages, European Patent Office, Rijswijk, Netherlands.

*Primary Examiner* — Wanda Z Russell
*Assistant Examiner* — Jeff Banthrongsack
(74) *Attorney, Agent, or Firm* — Parker Ibrahim & Berg LLC; James M. Behmke; Stephen D. LeBarron (57) ABSTRACT

In one embodiment, a device in a computer network establishes a reliable map that defines a set of packet criteria for which reliability is desired over an unreliable link to a peer device. In response to receiving a first packet from the peer device over the unreliable link, the device acknowledges the first packet to the peer device when the first packet matches the packet criteria of the reliable map. Also, in response to receiving a second packet destined via the peer device over the unreliable link, the device buffers the second packet when the second packet matches the packet criteria of the reliable map and retransmits the buffered second packet over the unreliable link to the peer device until acknowledged by the peer device.

22 Claims, 8 Drawing Sheets

(56) References Cited

U.S. PATENT DOCUMENTS

| | | |
|---|---|---|
| 2005/0122977 A1* | 6/2005 | Lieberman ............ H04L 69/326 370/394 |
| 2005/0229074 A1 | 10/2005 | Chawla et al. |
| 2005/0271019 A1* | 12/2005 | Yuan et al. .................... 370/338 |
| 2007/0094723 A1 | 4/2007 | Short et al. |
| 2007/0160073 A1* | 7/2007 | Toumura et al. ............... 370/419 |
| 2008/0025334 A1* | 1/2008 | Smith .................... H04L 1/1887 370/412 |
| 2009/0052412 A1 | 2/2009 | Kumar et al. |
| 2009/0190591 A1* | 7/2009 | Sankaran ...................... 370/392 |
| 2009/0207737 A1 | 8/2009 | Pappu et al. |
| 2009/0245105 A1* | 10/2009 | Ho ................................ 370/231 |
| 2010/0223658 A1* | 9/2010 | Narasimhan ...................... 726/4 |

* cited by examiner

IPV6 - NON FRAGMENTED PACKET    405

[SOURCE IP ADDRESS 311, SOURCE PORT 313,

DESTINATION IP ADDRESS 315, DESTINATION PORT 317,

PROTOCOL 319, UDP-CHECKSUM]

IPV6 - FRAGMENTED PACKET    410

[SOURCE IP ADDRESS 311, SOURCE PORT 313,

DESTINATION IP ADDRESS 315, DESTINATION PORT 317,

PROTOCOL 319, IP FRAGMENT-IDENTIFIER, IP FRAGMENT-OFFSET]

IPV4 - NON FRAGMENTED PACKET    415

[SOURCE IP ADDRESS 311, SOURCE PORT 313,

DESTINATION IP ADDRESS 315, DESTINATION PORT 317,

PROTOCOL 319, IP-IDENTIFIER]

IPV4 - FRAGMENTED PACKET    420

[SOURCE IP ADDRESS 311, SOURCE PORT 313,

DESTINATION IP ADDRESS 315, DESTINATION PORT 317,

PROTOCOL 319, IP-IDENTIFIER, IP FRAGMENT-OFFSET]

FIG. 4

```
RELIABLE-MAP<POLICY-NAME> {              505
    TERM <TERM-NAME> {                   510
        MATCH {                          515
            SOURCE-PREFIX <SOURCE ADDRESS/PREFIX LENGTH>;         520
            DESTINATION-PREFIX <DESTINATION ADDRESS/PREFIX LENGTH>;   525
            PROTOCOL <PROTOCOL-MAP>;     530
            PORT <PORT-MAP>;             535
        }
        ACTION BUFFER;                   540
    }
    TERM <TERM-NAME> {                   510
        MATCH {                          515
            SOURCE-PREFIX <SOURCE ADDRESS/PREFIX LENGTH>;         520
            DESTINATION-PREFIX <DESTINATION ADDRESS/PREFIX LENGTH>;   525
            PROTOCOL <PROTOCOL-MAP>;     530
            PORT <PORT-MAP>;             535
        }
        ACTION ACK;                      540
    }
}
```

RELIABLE PACKET DELIVERY WITH OVERLAY NETWORK (RPDON)

TECHNICAL FIELD

The present disclosure relates generally to computer networks, and, more particularly, to packet delivery within computer networks.

BACKGROUND

Computer networks often use intermediate devices to interconnect disparate networks together. For example, Field Area Routers (FARs) are routers in the Smart Grid network that are installed in the field at locations such as electricity poles. In one direction (often called the "southbound"), FARs connect LLN (Low power and lossy Networks) domains that may comprise a large number of devices such as sensors and actuators (e.g., smart objects or Minimalistic Connected Objects), often using low power wireless and/or power-line communication (PLC) links. FARs usually act as directed acyclic graph (DAG) roots, through which all of the traffic from the LLNs to a control center is transiting, and thus play a critical role in the infrastructure. In the reverse direction (often called the "northbound"), these routers illustratively communicate with the Utility Control Center in another network using various wireless backhaul technologies such as 2G, 3G, LTE, Wimax, etc., as will be readily understood in the art.

Often, these particular types of backhaul links that interconnect networks may be unreliable, and could lose their connection (e.g., wireless coverage) for several hours at a time. FARs, for instance, rarely have a connection to high-speed reliable uplinks, thus they use of unreliable or lossy links to connect to the control center. These FARs, in particular, may be connected to various devices such as electric/gas/water meters, relays, actuators, etc., where these devices send status message and/or receive control messages from applications in the Utility Control Center. Typically, these devices have limited CPU processing power and memory, and they cannot implement highly complex algorithms. However, it is desired for these types of devices, as well as for many other types of devices and network environments, to transmit the data reliably from the devices across the unreliable backhaul links, regardless of the delay associated with the delivery.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a computer network establishes a reliable map that defines a set of packet criteria for which reliability is desired over an unreliable link to a peer device. In response to receiving a first packet from the peer device over the unreliable link, the device acknowledges the first packet to the peer device when the first packet matches the packet criteria of the reliable map. Also, in response to receiving a second packet destined via the peer device over the unreliable link, the device buffers the second packet when the second packet matches the packet criteria of the reliable map and retransmits the buffered second packet over the unreliable link to the peer device until acknowledged by the peer device.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

Figure 1:
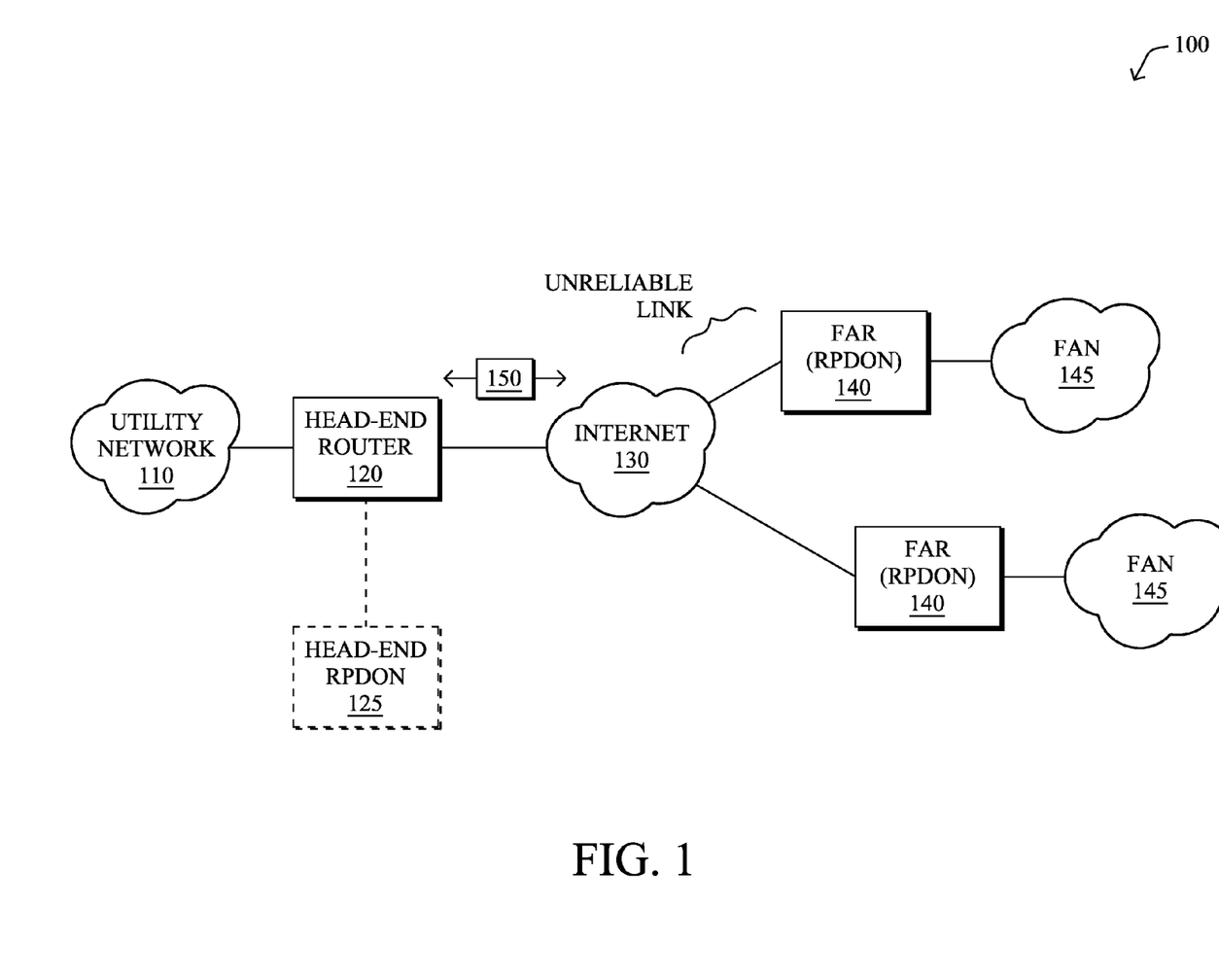
FIG. 1 illustrates an example computer network.

FIG. 1 is a schematic block diagram of an example computer network 100 illustratively comprising nodes/devices interconnected by various methods of communication. For instance, the links may be wired links or shared media (e.g., wireless links, PLC links, etc.) where certain nodes, such as, e.g., routers, sensors, computers, etc., may be in communication with other nodes, e.g., based on distance, signal strength, current operational status, location, etc. Those skilled in the art will understand that any number of nodes, devices, links, etc. may be used in the computer network, and that the view shown herein is for simplicity.

As specifically shown in FIG. 1, a utility network 110 may utilize a head-end router 120 to communicate with a public network such as the Internet 130. (In one illustrative embodiment, a separate head-end "RPDON" device 125 may also be present to separately execute the techniques herein, as described below.) In addition, one or more field area routers (FARs) 140 may interconnect corresponding FANs 145 to the network 130, as well. Generally, as described herein, the links connecting the FARs to the Internet 130 may be referred to as the backhaul network, and/or the unreliable links. Note that the network connectivity between the FANs 145 (e.g., a meter network) and the utility networks 110 (e.g., utility network end points, like Network Management Systems (NMS), Collection Engine (CE), etc.) can be broadly classified into three hops:

FAN network 145 (meters to FARs);
Backhaul network 130 (FAR 140 to Head-end Router 120), e.g., over wireless; and
Utility network 110 (Head-end Router 120 to CE/NMS).

Data packets 150 (or frames, datagrams, etc.) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other protocols where appropriate. In this context, a protocol consists of a set of rules defining how the nodes interact with each other.

Figure 2:
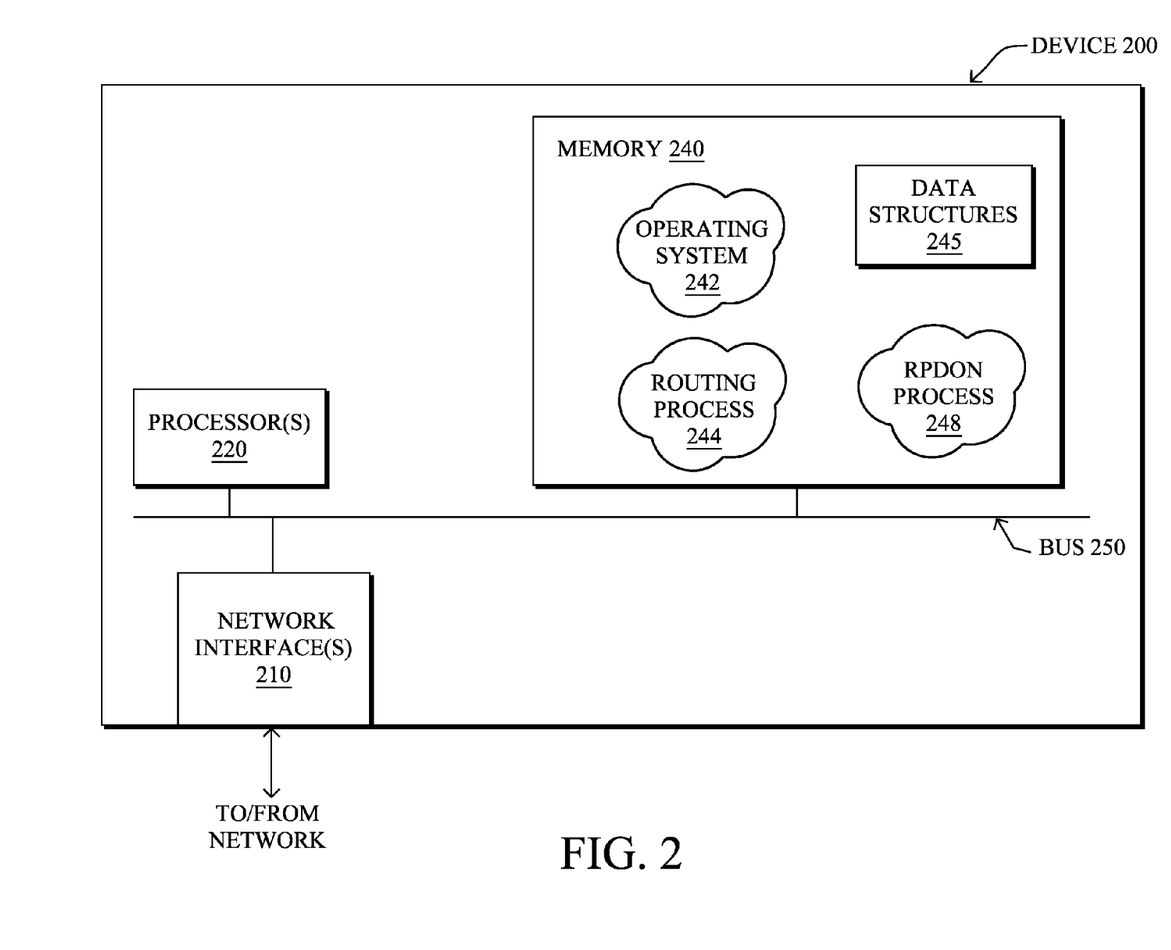
FIG. 2 illustrates an example network device/node.

FIG. 2 is a schematic block diagram of an example node/device 200 that may be used with one or more embodiments described herein, e.g., as a FAR 140 and/or head-end router 120 (or perhaps a separate head-end RPDON device 125, as described herein) of FIG. 1 above. The device may comprise one or more network interfaces 210 (e.g., wired, wireless, PLC, etc.), at least one processor 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from any power supply, for PLC the network interface 210 may communicate through a power supply, or may be an integral component of the power supply.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "RPDON" process 248, as described herein. Note that while RPDON process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may be configured to manage a routing/forwarding table (a data structure 245) containing, e.g., data used to make routing/forwarding decisions. In particular, in proactive routing, connectivity is discovered and known prior to computing routes to any destination in the network through various interior gateway protocols (IGPs) (e.g., link state routing such as Open Shortest Path First (OSPF), or Intermediate-System-to-Intermediate-System (ISIS), or Optimized Link State Routing (OLSR)), and/or border gateway protocols (BGPs). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point). An LLN, for instance, is one illustrative example of a FAN 145, with the FAR 140 acting as the central control point.

As noted above, particular types of backhaul links 130 (e.g., 3G, 4G, LTE, WiFi, WiMax, etc.) that interconnect networks (e.g., FANs, LLNs, etc.) may be unreliable, and could lose their connection (e.g., wireless coverage) for several hours at a time. FARs 140, for instance, rarely have a connection to high-speed reliable uplinks, thus they use of unreliable or lossy links to connect to the control center. These FARs, in particular, may be connected to various devices such as electric/gas/water meters, relays, actuators, etc., where these devices send status message and/or receive control messages from applications in the Utility Control Center 110. Typically, these devices have limited CPU processing power and memory, and they cannot implement highly complex algorithms. However, it is desired for these types of devices, as well as for many other types of devices and network environments, to transmit the data reliably from the devices across the unreliable backhaul links, regardless of the delay associated with the delivery.

There are a few different solutions related to the same problem, but none are specifically suited for the situation described above. A first example solution is using the transmission control protocol (TCP) between meter endpoints and utility network endpoints (an "end-to-end" solution), however, this is not a viable solution, as most applications on meters (and hence the unreliable link) prefer to utilize the user datagram protocol (UDP) for packet transmission because TCP is usually ill-suited to LLNs where packet drops are frequent, and changing current application software for this is not a valid proposal. Alternatively, then, TCP could be used between the utility network endpoints and the FAR itself, where the FAR acts as a proxy for all traffic between meter endpoints and utility network endpoints. However, this requires maintaining application level route tables, and is not a desirable solution. In particular, in this solution, the FAR acts as an application gateway and might have to support other applications going forward. In addition, utility software still needs to change to support TCP. Lastly, another solution is to create a reliable tunnel between the FAR 140 and the head-end router 120. Though this is a reasonable solution, it requires control of the head-end router to implement, and thus may not be available at all times.

Reliable Packet Delivery with Overlay Network (RPDON)

The techniques herein describe a separate control plane network to provide reliability for select packets exchanged between networks over an unreliable link, e.g., between a meter network and utility network (as one illustrative and non-limiting example). In particular, the techniques herein establish an "overlay" control plane specifically designed for low-data-rates and high durations of unavailable and/or unreliable links (e.g., several hours of network outages at a time). The overlay control plane is used for providing reliability for specific traffic flows (without modifying the transport protocol) by retransmitting buffered packets when they are lost and acknowledging the packets when they are successfully received from the peer, without modifying (remarking, header-rewriting, encapsulating) the original packet stream, and without requiring any end-point protocol change on end devices.

Specifically, according to one or more embodiments of the disclosure as described in detail below, a device in a computer network establishes a reliable map that defines a set of packet criteria for which reliability is desired over an unreliable link to a peer device. In response to receiving a first packet from the peer device over the unreliable link, the device acknowledges the first packet to the peer device when the first packet matches the packet criteria of the reliable map. Also, in response to receiving a second packet destined via the peer device over the unreliable link, the device buffers the second packet when the second packet matches the packet criteria of the reliable map and retransmits the buffered second packet over the unreliable link to the peer device until acknowledged by the peer device.

Illustratively, the techniques described herein may be performed by hardware, software, and/or firmware, such as in accordance with the RPDON process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional forwarding protocols, and as such, may be processed by similar components understood in the art that execute those protocols, accordingly. Note that in general, the RPDON process 248 is located on a complimentary sending device and receiving device (e.g., the illustrative FARs 140 and head-end router 120). That is, the illustrative RPDON protocol follows a peer-to-peer model, where each RPDON endpoint is providing reliability services for packets exchanged between its local network and peer network; i.e., if one RPDON endpoint applies buffering service on the packet, the same packet goes through the acknowledgment service on the peer RPDON endpoint. Since the reliability is required only in the backhaul network, the RPDON endpoints are located on either side of the backhaul network. In one specific embodiment, however, it is possible to have one or both "end-points" be a separate RPDON configured device, such as head-end RPDON device 125, the operation of which described below.

Figure 3:
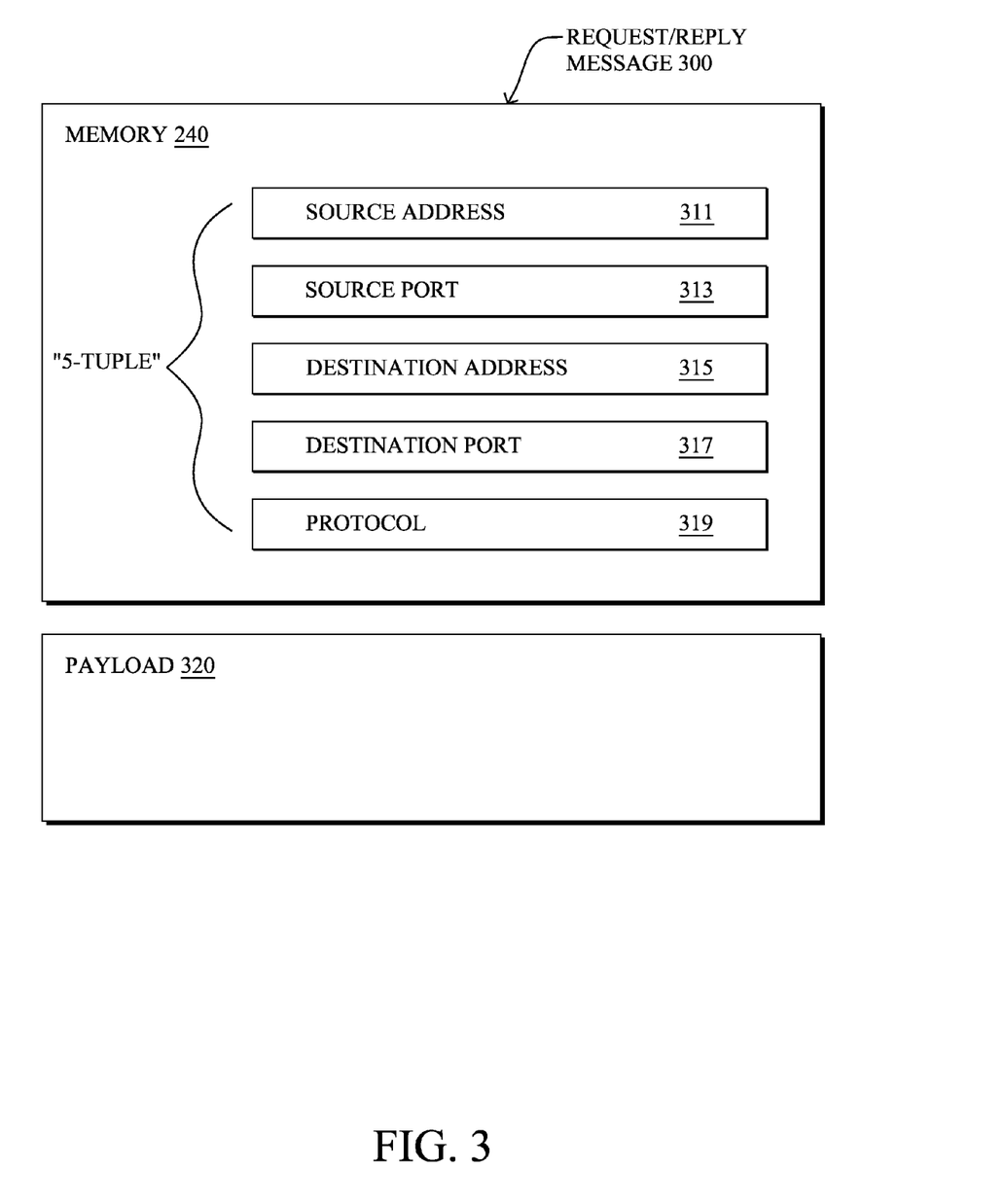
FIG. 3 illustrates an example packet format.

Operationally, the techniques herein uniquely identify flows such that each packet may be applied reliability services based on the identified flow. A RPDON flow is defined by set of fields from the packet 150 that uniquely identifies the packet. FIG. 3 illustrates an example simplified packet 300 (e.g., packet 150 from FIG. 1), generally comprising a header 310 and a payload 320. Header 310 is used by network-capable devices to route/forward the message 300 and its associated payload 320, and illustratively comprises at least a source address 311, source port 313, destination address 315, destination port 317, and a protocol 319. Other fields, flags, labels, sub-headers, etc., may also be present, but are not shown for clarity. For example, the fields from the packet 300 to form the flow may vary depending on the type of the packet.

Figure 4:
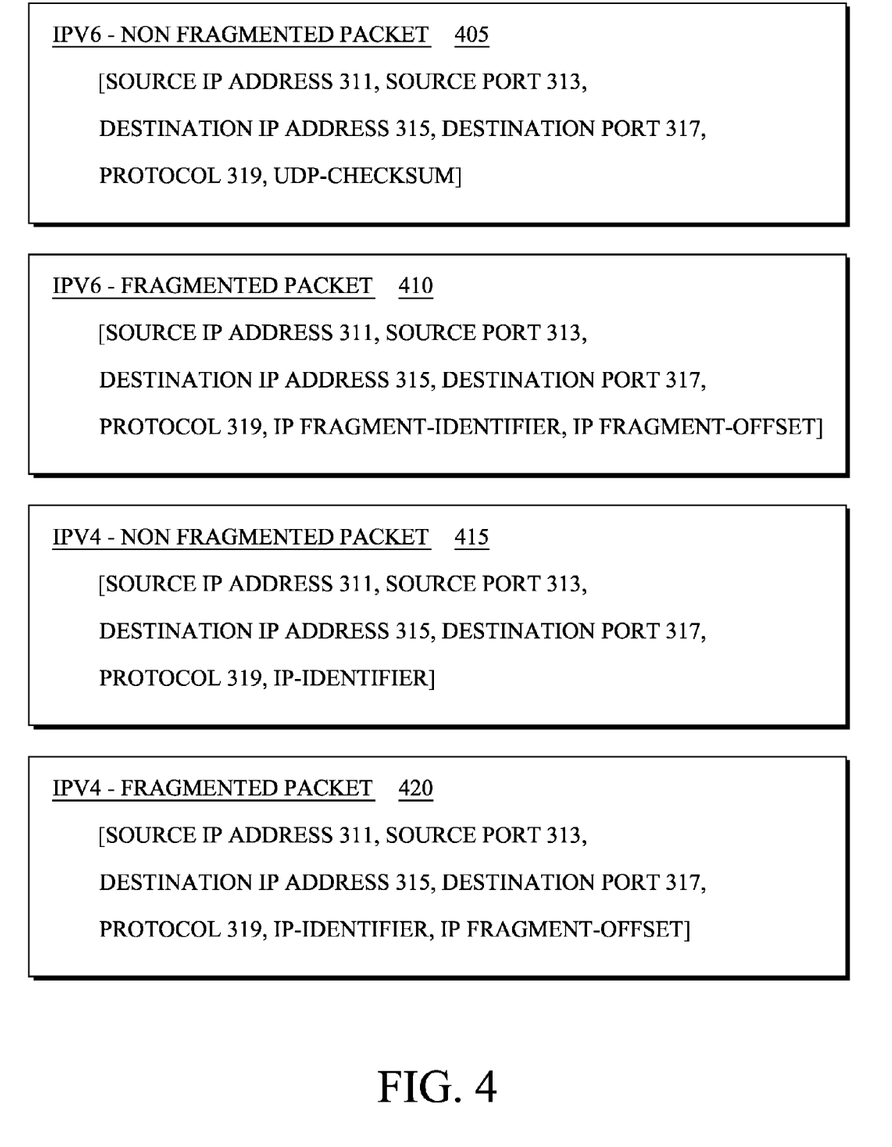
FIG. 4 illustrates an example of different flow identifiers based on packet types.

For instance, the listing shown in FIG. 4 illustrates the flow information for each type of packet. In particular, in addition to the source IP address 311, source port 313, destination IP address 315, destination port 317, and protocol 319, each type of packet may have additional information to identify the flow. For example, for an IPv6-non fragmented packet 405, the additional information comprises a UDP checksum (when UDP is the underlying protocol), while an IPv6-fragmented packet 410 comprises an IP Fragment-identifier and IP Fragment-offset. Similarly, an IPv4-non fragmented packet 415 comprises an IP-identifier, and an IPv4-fragmented packet 420 comprises an IP-identifier and IP Fragment-offset. Note that the techniques herein assume that reliability services are used for UDP packets, that the UDP checksum uniquely identifies the packets within the 5-tuple, and that the IP-identifier is always present for IPv4 packets (and thus the UDP checksum may not be used, since it is not mandatory in IPv4).

According to one or more embodiments herein, RPDON implements a concept of "reliable-maps" (similar to route-maps or class-maps), that allows an administrator to selectively filter the packets that need to be buffered. That is, instead of applying reliable services for all packets exchanged between networks separated by an unreliable link (e.g., meter and utility network endpoints), the techniques herein can filter and classify the packets to which reliability services should be applied. As described below, for instance, the techniques establish a reliable map (policy) that defines a set of packet criteria for which reliability is desired over an unreliable link to a peer device. The reliable map is shared with all participating RPDON devices, and can either be statically specified (e.g., by an NMS) and downloaded during a bootstrapping phase, or alternatively may be dynamic as explained below.

Figure 5:
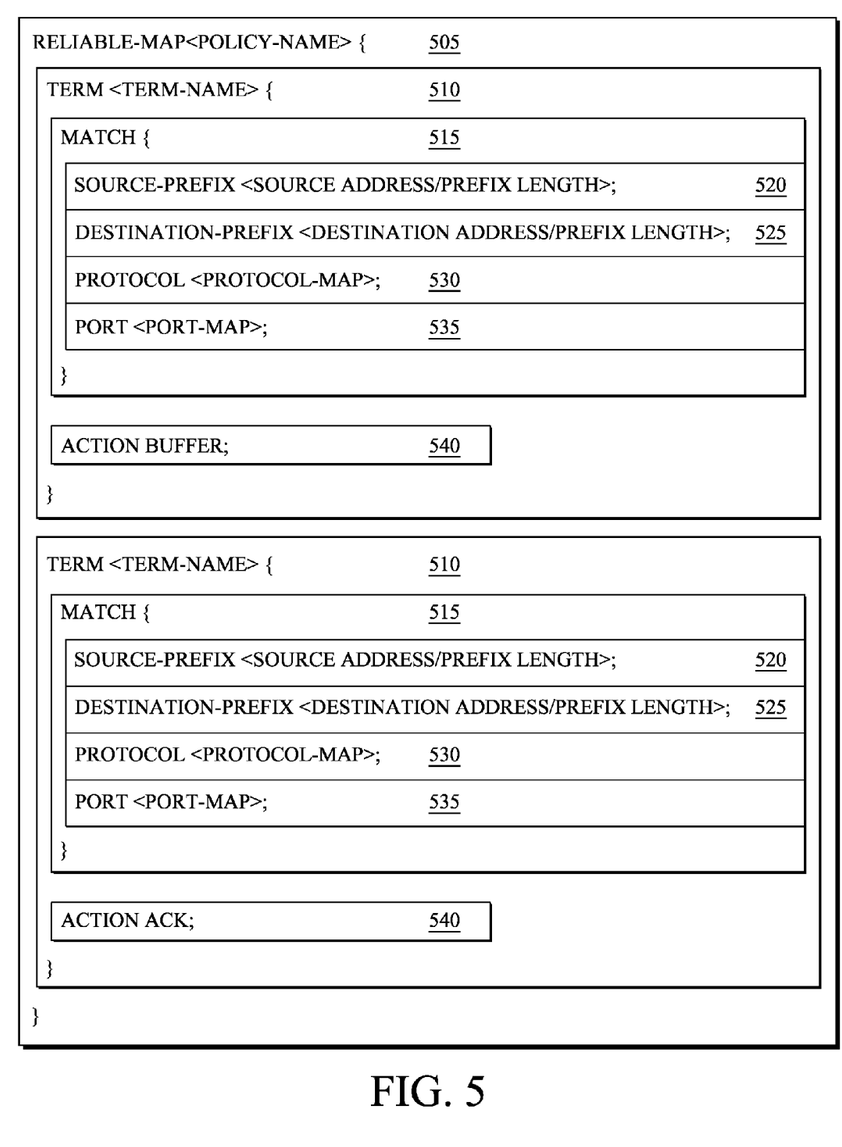
FIG. 5 illustrates an example reliable map.

FIG. 5 illustrates an example reliable map 500 in accordance with the techniques herein. As shown in FIG. 5, the policy defined by a particular reliable map 505 has a variable number of rules (terms) 510, where each term inside the policy has a set of match conditions 515 and a corresponding action statement 540. The match conditions ("packet criteria") are generally based on source prefix 520, destination prefix 525, protocol 530, and port information 535. The action statement 540 has two options, buffer and acknowledge, thus an example policy would have similar terms 510, one for each action 540, as shown in FIG. 5.

Note that in one or more embodiments herein, reliable maps 500 may be dynamic, for example, modifying the reliable map in response to network conditions. For example, rules specifying a set of events acting as triggers may be established (e.g., packet flows of certain types may be buffered if the systems determines that there is a sudden traffic storm, in which case some types of packets may become critically important thus requiring the use of RPDON). In yet another embodiment, an NMS (or other controller device) may dynamically update the reliable map by multicasting newly defined types of packets, such as "start using RPDON for packets of type X for a period of time T," e.g., should there be a detected high packet loss for type X that requires RPDON. In this manner, one or more packet criteria of the reliable map may also be configured to be applied for a set period of time (T).

In one or more additional embodiments, other deep packet inspection (DPI) techniques may be used for flow identification, such that packet criteria of the reliable map are based on DPI. Further, the flow identification may also be performed by the end device (such as a meter or hosted application on an end device) to uniquely identify a packet flow such as a packet train (e.g., a load curve on a meter). The end device, i.e., an originating device of the packet, may include a flow identifier (ID) within the packet, such as an IPv6 Flow Label field, thus avoiding packet flow identification operation on FARs. In other words, when the originating device of the packet includes such a flow ID within the packet (based on one or more packet criteria), then the RPDON devices can determine whether the packet matches the packet criteria of the reliable map 500 based on the flow ID, accordingly.

Figure 6:
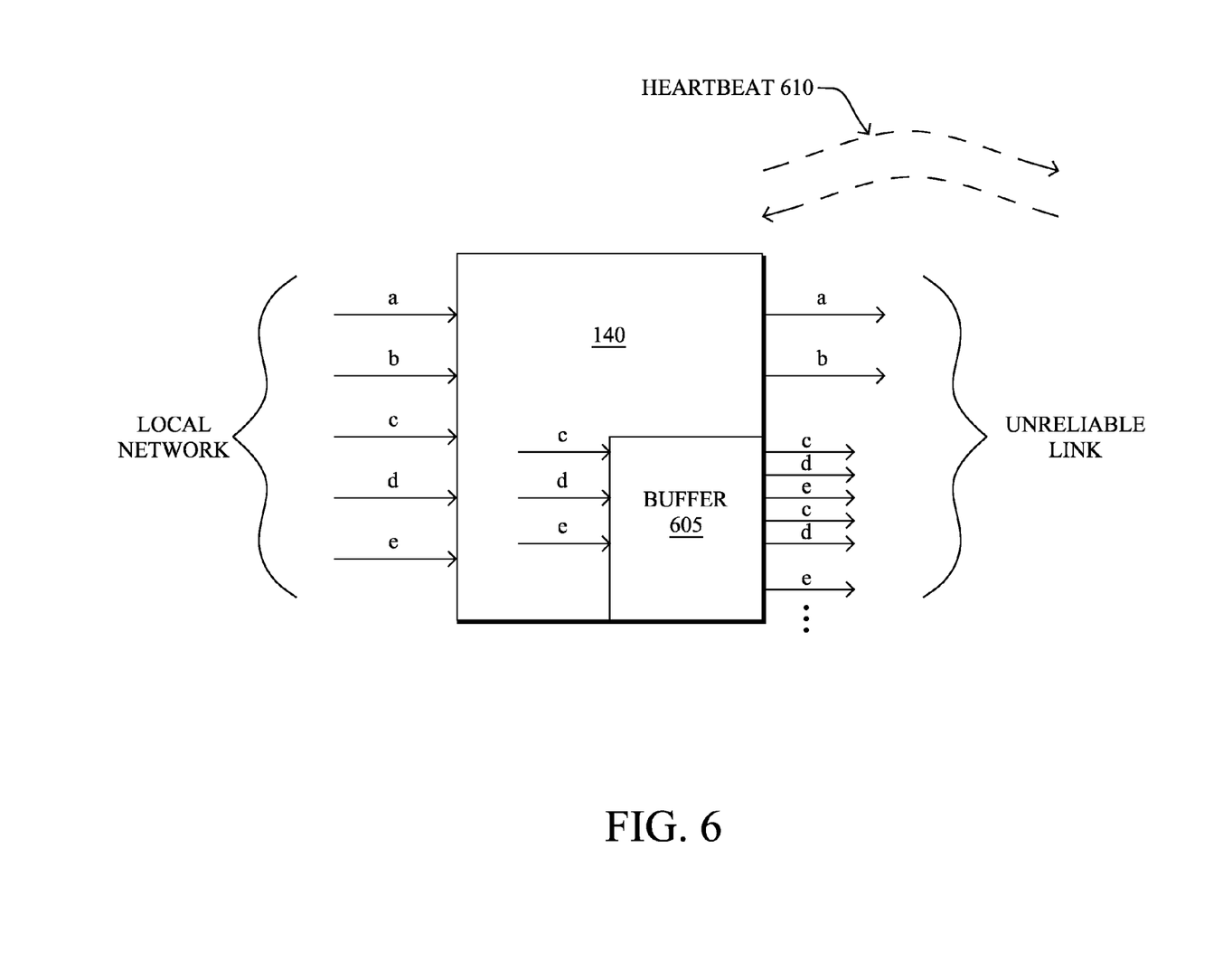
FIG. 6 illustrates an example packet flow through a sending device.

FIG. 6 illustrates an example packet flow through a sending device, such as a FAR 140. In particular, in response to receiving a packet destined via a peer device (e.g., head-end router 120) over the unreliable link, the sending device may decide to buffer the packet (in buffer 605) when it matches the packet criteria of the reliable map 500, as described above. Those buffered packets may then be (re)transmitted over the unreliable link when the link becomes available to the peer device until acknowledged by the peer device, at which time they may be deleted from the buffer 605 ("debuffered" or "unbuffered"). In this manner, if the peer does not acknowledge the packet, it is assumed that the buffered packets or the acknowledgements from peer are lost in transit, and the buffered packets will continue to be retransmitted to the peer.

According to the specific example of FIG. 6, assume that packets "a" through "e" are received at the FAR 140. If packets "a" and "b" do not match the packet criteria of the reliable map 500, then they are simply passed through the sending device 140 without further RPDON processing. Conversely, assume that when packets "c," "d," and "e" are received at the sending device 140, they match the criteria, and are thus forwarded to the buffer 605 for reliable RPDON processing. At this time, packets "c," "d," and "e" are (re)transmitted from the buffer 605 until receiving an acknowledgment of their receipt by the corresponding RPDON peer receiving device (as in FIG. 7 below).

According to an illustrative embodiment herein, for each buffered packet, a retransmission back-off timer is started, which may be exponentially backed-off. For example, the timer values (in seconds) after each repeated retransmit attempt may be as follows. {4, 16, 64, 256, 1024, 3600, 3600, 3600, 3600}. If so configured, if the buffered packet is retransmitted for a maximum number of attempts, the packet may be dropped and does not receive a successful buffering service. If an acknowledge message (ACK) is successfully received from the peer, the retransmission timer is stopped and the buffer entry is cleared from the database (buffer 605).

In yet another embodiment, the retransmission timer may be dynamic and can be obtained upon bootstrapping (e.g., from an NMS), or else an application that notifies the RPDON process 248 whether delay is critical or not. Alternatively or in addition, the RPDON process may also dynamically compute the retransmission timer according to the observed times for ACKs to be received, possibly augmented by a pre-defined factor. For example, since in most cases 3G/4G public networks may experience some level of congestion (public networks), the RPDON process may make use of historical maps to adapt the timers according to the expected delays in the public network during the day. Alternatively, the retransmission timer may be computed according to the available resources on the router (e.g., using shorter timer values as the buffer gets full).

To determine whether the backhaul network (unreliable link) is available at all, RPDON process 248 may run/monitor a HEARTBEAT message 610 between its two endpoints. The heartbeat message may be sent at any configured interval, such as every 1 minute, and a loss of a certain number of heartbeats (e.g., three) will mark the backhaul down. When the backhaul (unreliable link) is down, as indicated by determining that the heartbeat signal 610 is lost, the retransmission timers are stopped, and transmission of the buffered packet(s) is ceased, with the packet(s) still kept/held in the buffer 605. They are restarted when the backhaul comes back up. In one embodiment, all the buffered packets may be sent immediately upon the backhaul coming back up, irrespective of their existing timeouts. After this initial retry, they may then fallback to their old retransmission timeouts, or else may restart their back-off timers, accordingly.

Note that the RPDON techniques herein do not guarantee that packets are not out-of-order, nor that duplicate packets are not delivered. However, for certain networks where reliability is given utmost importance, and these factors are not seen as an issue, and can be handled by the corresponding application.

Figure 7:
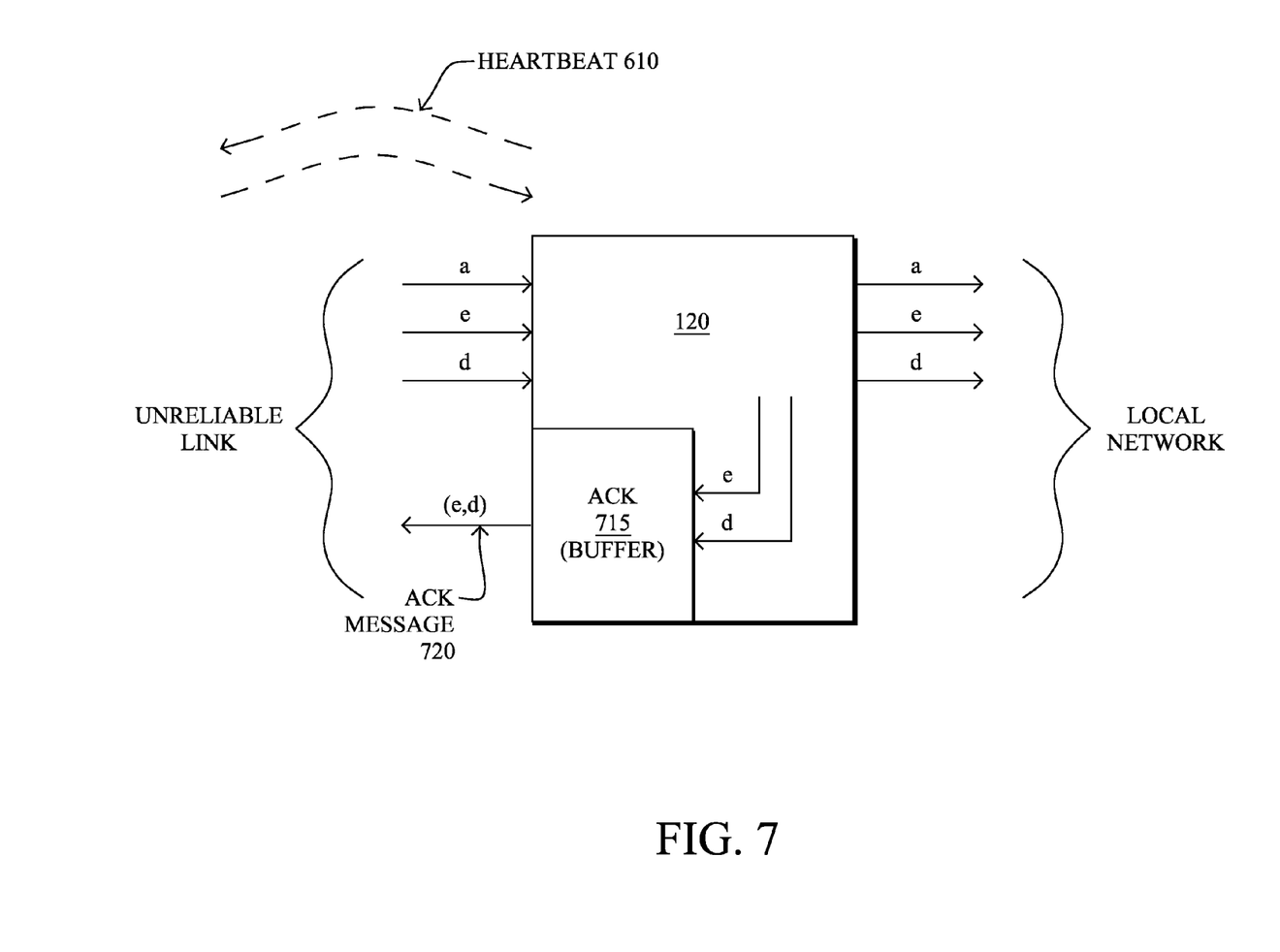
FIG. 7 illustrates an example packet flow through a receiving device.

As shown in FIG. 7, which illustrates an example packet flow through a receiving device (e.g., head-end router 120), the captured packets are parsed and a flow is identified from the packet for comparison to the corresponding reliable map 500 on the receiving peer. The flow entries may be buffered for each peer (ACK buffer 715), and the flow entries may then be acknowledged in an ACK message 720 to the peer. Note that for the ACK service, instead of the sending the whole packet as an acknowledgement, the flow information is sent to the peer in ACK 720. Note further that in one embodiment, the flow entries may be saved so that they can be batched in one single message when sent to the peer, e.g., every 500 msecs (or other configurable value).

Referring again to the specific example, assume that packets "a," "e," and "d" are received, and in that order. Again, packet "a" would not meet the reliable map packet criteria, and would be passed on toward its destination without a specific RPDON ACK message. Packet "b" is not received, but does not require reliable transmission, so no action would be taken. Upon receiving packets "e" and "d," which are also forwarded on to their destination, the flow IDs for these packets are buffered in ACK buffer 715, and then an ACK message 720 may be generated and returned to the corresponding RPDON peer to instruct that peer to cease retransmission of those packets ("e" and "d"). At this time, the sending peer device (e.g., FAR 140 of FIG. 5) would continue retransmitting packet "c," as it has not yet been received nor acknowledged by the receiving peer device 120. The situation may also exist where the unreliability causes the ACK message 720 to be lost during the return, and the sending peer device 140 would then also continue to retransmit the packets indicated in the lost ACK, since it does not know that the packets have been received otherwise.

Note that as mentioned above, if the actual head-end router 120 (or other RPDON peer device) is not configured with a RPDON process 248, that all received packets (or at least all packets matching the packet criteria, if a minimalistic version of RPDON is available on the device) may be forwarded to a specific RPDON device 125 for processing. These forwarded received packets may be the original packet, or else may be copies of the packets solely for the purpose of providing RPDON service. For sourced packets (as sending device), the RPDON device 125 may be used to enable the buffering and retransmitting services, accordingly, while received packets, device 125 may return the desired ACKs 720.

Figure 8:
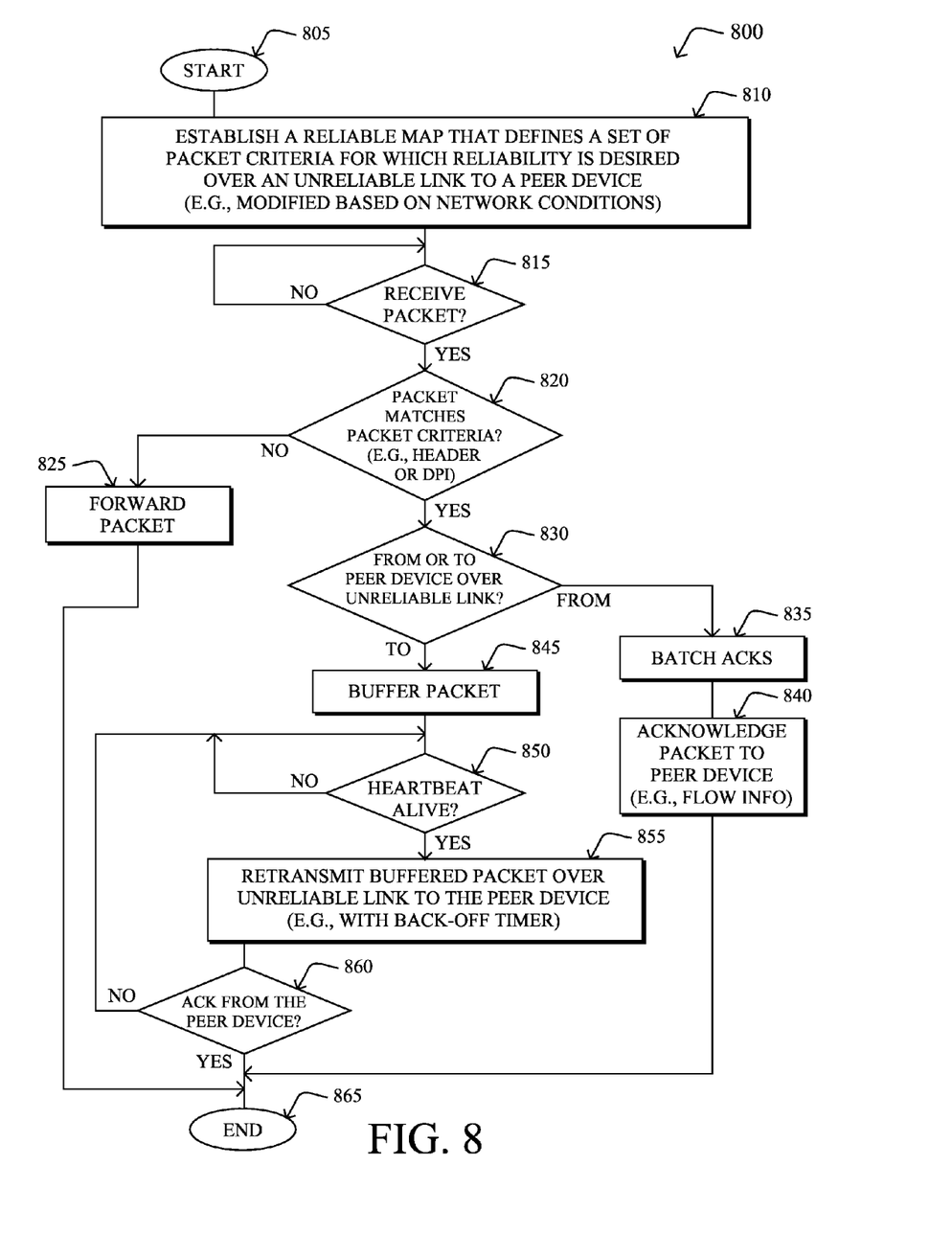
FIG. 8 illustrates an example simplified procedure for reliable packet delivery with an overlay network.

FIG. 8 illustrates an example simplified procedure for reliable packet delivery with an overlay network in accordance with one or more embodiments described herein. The procedure 800 may be executed by either the sending device or receiving device (e.g., FAR 140 or head-end router 120, illustratively), and may start at step 805, and continues to step 810, where, as described in greater detail above, a reliable map 500 is established (e.g., configured, determined, dynamically created/modified based on network conditions, etc.) that defines a set of packet criteria for which reliability is desired over an unreliable link to a peer device. Upon receiving a packet 300 in step 815, the device applies the reliable map 500 to determine whether the packet matches the configured packet criteria in step 820, such as based on header information or DPI operation, as described above. If there is no match, then reliability is not desired for this particular packet, and in step 825 the device simply forwards the packet on its way.

With the packet matching the reliable map packet criteria, the procedure 800 continues depending on whether the device is a receiving device or sending device in step 830, that is, whether the packet is from or to the peer device over the unreliable link. If from the link, i.e., the receiver device, then in step 835 the receiving device may optionally batch a plurality of ACKs 720, and in step 840 returns an acknowledge packet (ACK) 720 to the peer device (e.g., with the flow info).

Conversely, if destined via the peer device over the unreliable link in step 830, then in step 845 the sending device buffers the packet, and optionally so long as the heartbeat 610 is alive in step 850, then in step 855 the sending device (re)transmits the buffered packet over the unreliable link to the peer device, illustratively according to the back-off timer as described above. The retransmission in step 855, while the heartbeat in step 850 is still alive, continues until receiving an ACK 720 from the peer device in step 860. Once the ACK is received in step 860, then the procedure 800 may end in step 865, and the packet may be unbuffered from the sending device, accordingly.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for reliable packet delivery with an overlay network. In particular, the techniques herein address a number of critical issues for routers interconnected by low-speed or unreliable links such as 3G and 4G, specifically by building reliability for non delay sensitive traffic without modifications to the network endpoint applications. For instance, the techniques herein allow the unreliable backhaul link to be down for several hours, working seamlessly over existing network protocols, and does not require changes in packet headers or encapsulations, such that all existing configurations (e.g., QoS, DPI, classifications, etc.) and tools work without any changes. This also allows for significant simplification of application programs, since they don't have to worry about network level unreliability.

While there have been shown and described illustrative embodiments that provide for reliable packet delivery with an overlay network, it is to be understood that various other adaptations and modifications may be made within the spirit and scope of the embodiments herein. For example, the embodiments have been shown and described herein with relation to metering and utility networks. However, the embodiments in their broader sense are not as limited, and may, in fact, be used with other types of interconnected networks and/or protocols, such as vehicle-to-vehicle or other non delay sensitive data transmission.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   establishing, at a node that is a head end router or a field area router (FAR) connecting a first network to a second network within a computer network, a reliable map that defines a set of packet criteria for which reliability is desired over an unreliable link to a peer device;
   receiving, at the node, a first packet from the peer device over the unreliable link;
   determining, by the node, whether the first packet matches the packet criteria of the reliable map;
   in response determining the first packet matches the packet criteria of the reliable map, acknowledging, by the node, the first packet to the peer device;
   receiving, at the node, a second packet destined to be sent to the peer device over the unreliable link;
   determining, by the node, whether the second packet matches the packet criteria of the reliable map; and
   in response to determining that the second packet matches the packet criteria of the reliable map, buffering, by the node, the second packet, and
retransmitting, by the node, the buffered second packet over the unreliable link to the peer device until acknowledged by the peer device, wherein a header of the second packet remains unchanged without modifying an original packet stream and without requiring any endpoint protocol changes on end devices and a process makes use of historical maps to adapt timers according to expected delays.

2. The method as in claim 1, further comprising:
monitoring a heartbeat signal with the peer device; and
in response to determining that the heartbeat signal is lost to indicate that the unreliable link is down, ceasing retransmission of the buffered second packet while the unreliable link is down.

3. The method as in claim 1, wherein acknowledging the first packet to the peer device comprises:
sending a message having flow information of the first packet.

4. The method as in claim 1, wherein acknowledging the first packet to the peer device comprises:
batching acknowledgments for a plurality of packets from the peer device that match the packet criteria of the reliable map; and
sending a single message for the batched acknowledgments.

5. The method as in claim 1, wherein retransmitting comprises:
retransmitting the second packet repeatedly based on a back-off timer.

6. The method as in claim 1, further comprising:
modifying the reliable map in response to network conditions.

7. The method as in claim 1, wherein one or more packet criteria of the reliable map are configured to be applied for a set period of time.

8. The method as in claim 1, wherein an originating device of the second packet is configured to include a flow identifier (ID) within the second packet based on one or more packet criteria, and wherein the second packet matches the packet criteria of the reliable map based on the flow ID.

9. The method as in claim 1, wherein one or more packet criteria of the reliable map are based on deep packet inspection.

10. The method as in claim 1, wherein one or more packet criteria of the reliable map are based on one or more criteria selected from a group consisting of: a source prefix; a destination prefix; a protocol; and a port.

11. The method as in claim 1, wherein a plurality of packets that match the packet criteria of the reliable map are buffered and retransmitted, and wherein the retransmitting of the plurality of packets allows for the packets of the plurality of packets to be transmitted out-of-order.

12. The method as in claim 1, wherein the unreliable link utilizes a user datagram protocol (UDP) for packet transmission.

13. An apparatus, comprising:
a network interface to communicate over an unreliable link with a peer device;
one or more network interfaces to communicate with other devices not over the unreliable link;
a processor coupled to the network interfaces and adapted to execute one or more processes; and
a memory configured to store a process executable by the processor, the process when executed operable to:
establish a reliable map that defines a set of packet criteria for which reliability is desired over the unreliable link to the peer device;
receive a first packet from the peer device over the unreliable link;
determine whether the first packet matches the packet criteria of the reliable map;
in response to a determination that the first packet matches the packet criteria of the reliable map, acknowledge the first packet to the peer device;
receive a second packet destined via the peer device over the unreliable link;
determine whether the second packet matches the packet criteria of the reliable map; and
in response to a determination that the second packet matches the packet criteria of the reliable map,
buffer the second packet, and
retransmit the buffered second packet over the unreliable link to the peer device until acknowledged by the peer device, wherein a header of the second packet remains unchanged without modifying an original packet stream and without requiring any endpoint protocol changes on end devices and a process makes use of historical maps to adapt timers according to expected delays, and
wherein the apparatus is a node that is a head end router or a field area router (FAR) connecting a first network to a second network within a computer network.

14. The apparatus as in claim 13, wherein the process when executed is further operable to:
monitor a heartbeat signal with the peer device; and
determine that the heartbeat signal is lost to indicate that the unreliable link is down; and
cease retransmission of the buffered second packet while the unreliable link is down.

15. The apparatus as in claim 13, wherein the process when executed to acknowledge the first packet to the peer device is further operable to:
send a message having flow information of the first packet.

16. The apparatus as in claim 13, wherein the process when executed to acknowledge the first packet to the peer device is further operable to:
batch acknowledgments for a plurality of packets from the peer device that match the packet criteria of the reliable map; and
send a single message for the batched acknowledgments.

17. The apparatus as in claim 13, wherein the process when executed to retransmit is further operable to:
retransmit the second packet repeatedly based on a back-off timer.

18. The apparatus as in claim 13, wherein the process when executed is further operable to:
modify the reliable map in response to network conditions.

19. The apparatus as in claim 13, wherein one or more packet criteria of the reliable map are configured to be applied for a set period of time.

20. The apparatus as in claim 13, wherein an originating device of the second packet is configured to include a flow identifier (ID) within the second packet based on one or more packet criteria, and wherein the second packet matches the packet criteria of the reliable map based on the flow ID.

21. The apparatus as in claim 13, wherein one or more packet criteria of the reliable map are based on deep packet inspection performed by the process.

22. A tangible, non-transitory, computer-readable media having software encoded thereon, the software when executed by a processor on a node that is a head end router or a field area router (FAR) connecting a first network to a second network in a computer network operable to:
- establish a reliable map that defines a set of packet criteria for which reliability is desired over the unreliable link to the peer device;
- receive a first packet from the peer device over the unreliable link;
- determine whether the first packet matches the packet criteria of the reliable map;
- in response to a determination that the first packet matches the packet criteria of the reliable map, acknowledge the first packet to the peer device;
- receive a second packet destined via the peer device over the unreliable link;
- determine whether the second packet matches the packet criteria of the reliable map; and
- in response to a determination that the second packet matches the packet criteria of the reliable map,
    - buffer the second packet, and
    - retransmit the buffered second packet over the unreliable link to the peer device until acknowledged by the peer device, wherein a header of the second packet remains unchanged without modifying an original packet stream and without requiring any endpoint protocol changes on end devices and a process makes use of historical maps to adapt timers according to expected delays.

* * * * *